C. W. MOTT.
STEERING DEVICE FOR VEHICLES.
APPLICATION FILED SEPT. 14, 1914.

1,343,225. Patented June 15, 1920.
4 SHEETS—SHEET 1.

Witnesses:
C. C. Palmer.
Chas. L. Byron

Inventor.
Carl W. Mott,
By Chas. E. Lord
Atty.

C. W. MOTT.
STEERING DEVICE FOR VEHICLES.
APPLICATION FILED SEPT. 14, 1914.

1,343,225.

Patented June 15, 1920.
4 SHEETS—SHEET 3.

Witnesses:
C. C. Palmer.
Chas. L. Byron

Inventor:
Carl W. Mott,
By Chas. E. Lord
Atty.

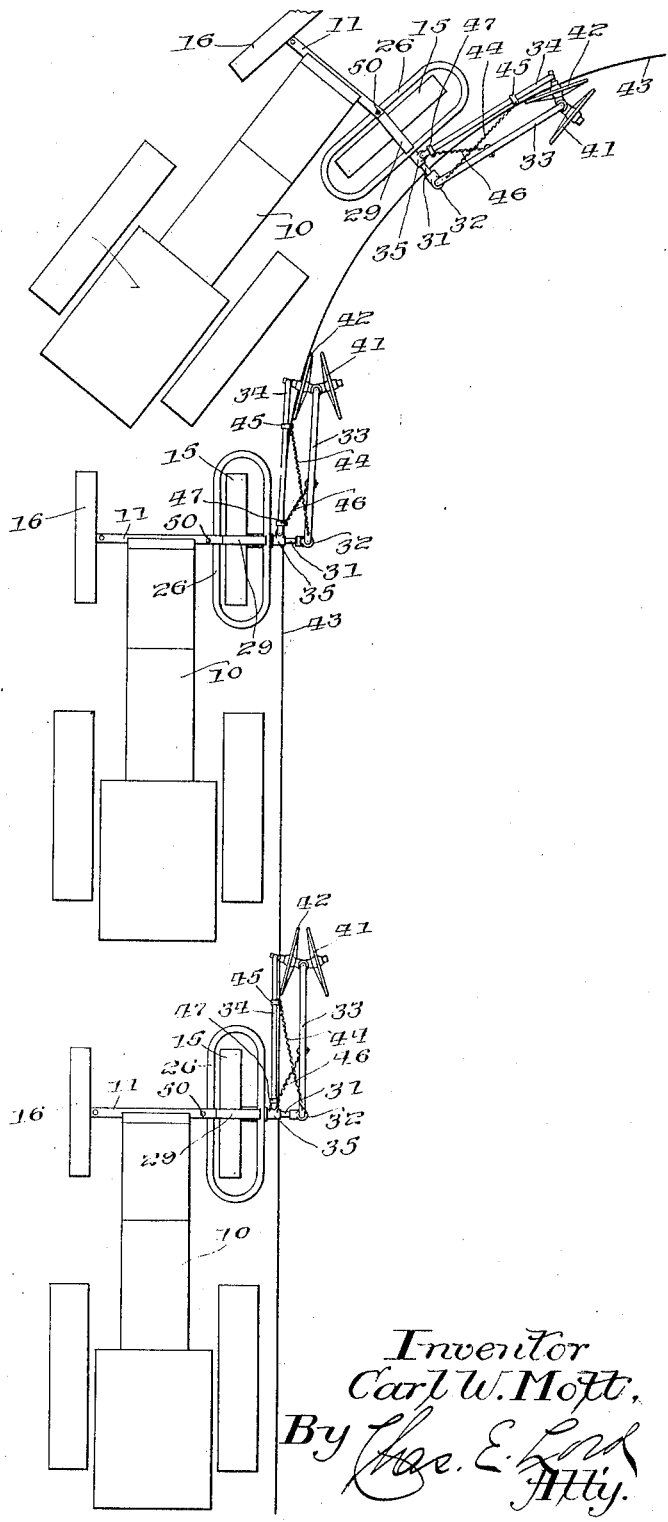

UNITED STATES PATENT OFFICE.

CARL W. MOTT, OF CHICAGO, ILLINOIS, ASSIGNOR, BY MESNE ASSIGNMENTS, TO INTERNATIONAL HARVESTER COMPANY, A CORPORATION OF NEW JERSEY.

STEERING DEVICE FOR VEHICLES.

1,343,225.　　　　Specification of Letters Patent.　　Patented June 15, 1920.

Application filed September 14, 1914. Serial No. 861,546.

*To all whom it may concern:*

Be it known that I, CARL W. MOTT, a citizen of the United States, residing at Chicago, in the county of Cook and State of Illinois, have invented certain new and useful Improvements in Steering Devices for Vehicles, of which the following is a full, clear, and exact specification.

This invention relates to steering devices for vehicles.

The main object of the invention is to simplify and improve steering devices, and to render a steering device self-controllable or entirely automatic in its operation.

Another object of this invention is to guide a vehicle or traction engine in a manner such that plows being drawn by the vehicle or traction engine will not pass over land already plowed in making a curve.

A further object of this invention is to provide an inexpensive and reliable automatic steering device adapted to meet all of the requirements for successful commercial operation.

These and other objects are accomplished by providing a traction engine with an automatic self-controllable steering device, including a plurality of coöperating members which control each other in a manner to properly guide a vehicle or traction engine under all conditions of operation.

The invention is illustrated on the accompanying sheets of drawings, in which—

Fig. 4 is a fragmentary side elevation of the rear of the traction engine showing the operating lever for raising and lowering the pilot wheels of the traction engine out of and into the furrow:

Fig. 5 is a detail view of the pilot wheels showing their intercontrollable relations when in and out a furrow; and, Fig. 6 shows diagrammatically a traction engine on a straight way and making a curve while being guided with my improved steering device.

Figure 1:
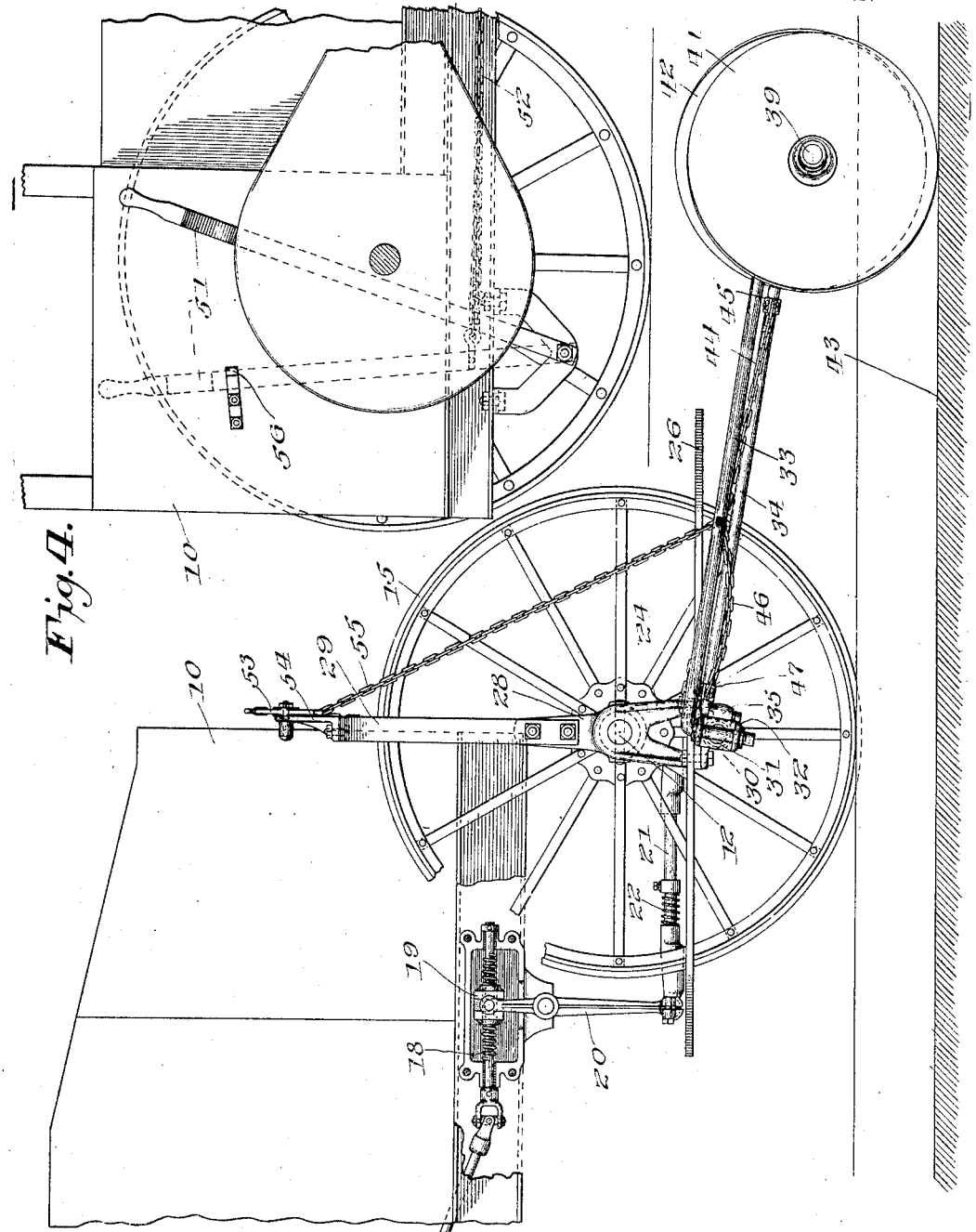
Figure 1 is a side elevation of a portion of a traction engine and my improved steering device therefor.

The various novel features of my invention will be apparent from the following description and drawings, and will be clearly set forth in the appended claims.

The traction engine 10 shown in the drawings may be of any type having a relatively stationary front axle member 11 in which are journaled stub axles 12 and 13, which are interconnected with the usual automobile type connecting link 14. Mounted upon the stub axles 12 and 13 respectively are the regular front steering wheels 15 and 16 of the traction engine, said wheels being controllable by hand from the cabin of the traction engine by means of connections including a hand operated steering axle 17 operatively connected to a properly supported screw 18, embraced by a nut 19, which may be actuated by turning the screw 18, said nut 19 being operatively connected to the stub axles for transmitting motion thereto by a pivotally mounted arm 20 and link 21. Surrounding this link 21 are two coiled springs 22 and 23 respectively, which serve to cushion jars which otherwise might be transmitted from the steering wheels, and also which permit the traction engine to be automatically guided by the steering device.

This automatic steering device is connected to the traction engine by means, including a casting 24 supported by the end of the stub axle 12, said casting having a cap portion 25 serving the regular purposes of caps for the ends of axles. This casting 24 is braced by a band 26 of metal which surrounds the front traction engine wheel 15, and is secured to the casting 24 and a portion of the stub axle 12 by an angle member 27. Also connecting another portion 28 of the casting 24 and the upper part of stub axle 12 is a strap 29.

A bearing 30 formed in the casting or bracket member 24 receives a rod 31, at one end of which is secured a U-shaped bearing member 32 for the reception of one end of the main member 33 of a steering pole which includes another parallel arranged member 34, the latter being pivotally mounted in a collar 35, also mounted on the rod 31, and held against sidewise movement by casting 30 and key 36. Loosely mounted on the front depending portion 37 is a sleeve 38 to which is secured two adjustable axle members 39 and 40 respectively. These axle members, which also are relatively adjustable, have mounted thereon intercontrollable furrow pilot wheels 41 and 42 respectively, which form a self-controlling pilot unit. It is to be noted that the furrow pilot wheel 41, which engages only the bottom of the furrow 43, is set at an angle with respect to the side wall of the furrow in a manner to force the other furrow pilot wheel 42 against and to hold it in engagement with the side wall of the furrow 43. It is to be noted also that wheel 42 engages only the side wall of the furrow and not the bottom thereof. These two furrow pilot wheels which converge forwardly with respect to each other automatically guide the traction engine under all conditions of operation.

Figure 2:
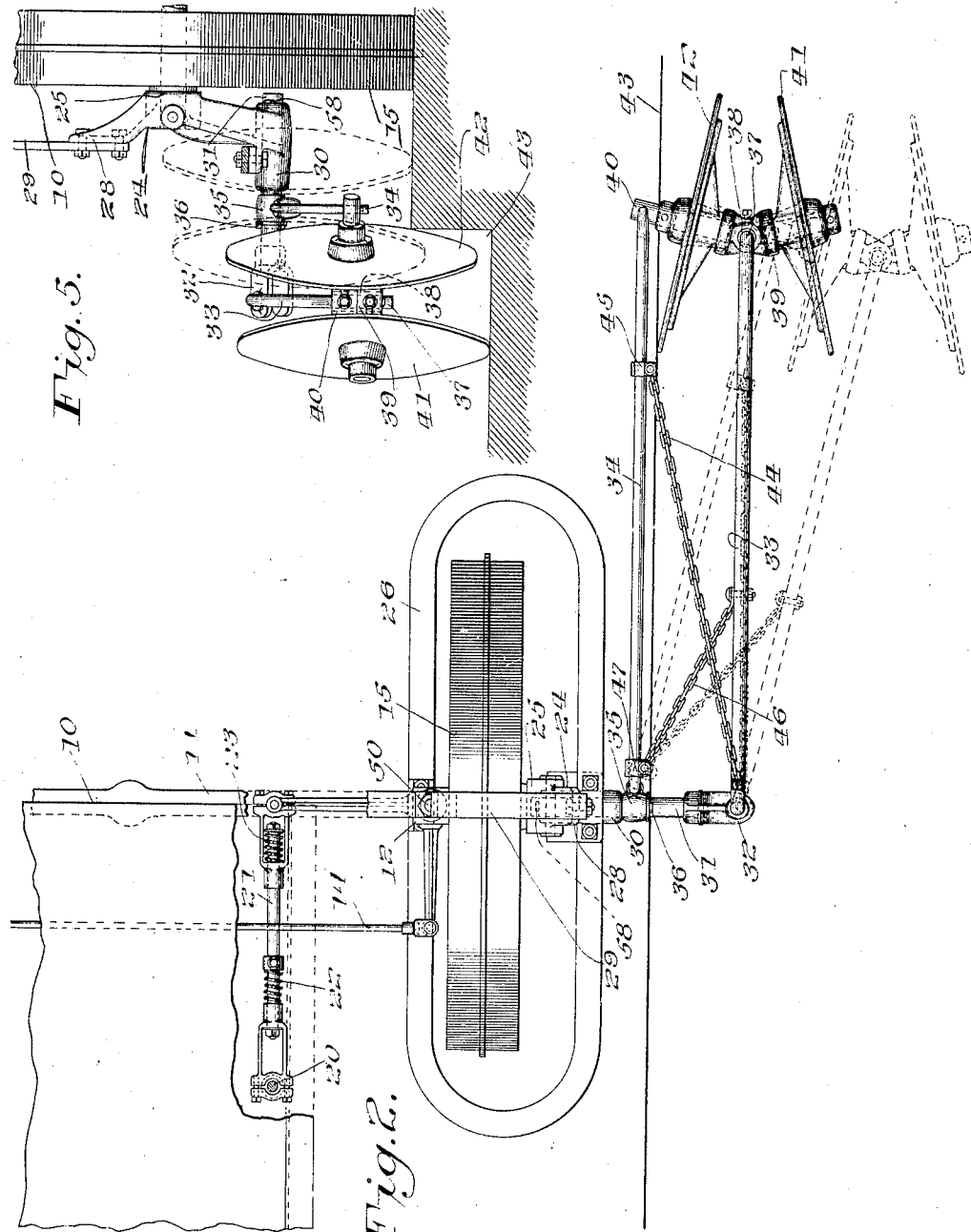
Fig. 2 is a plan view of the same steering device connected to the traction engine.
Figure 3:
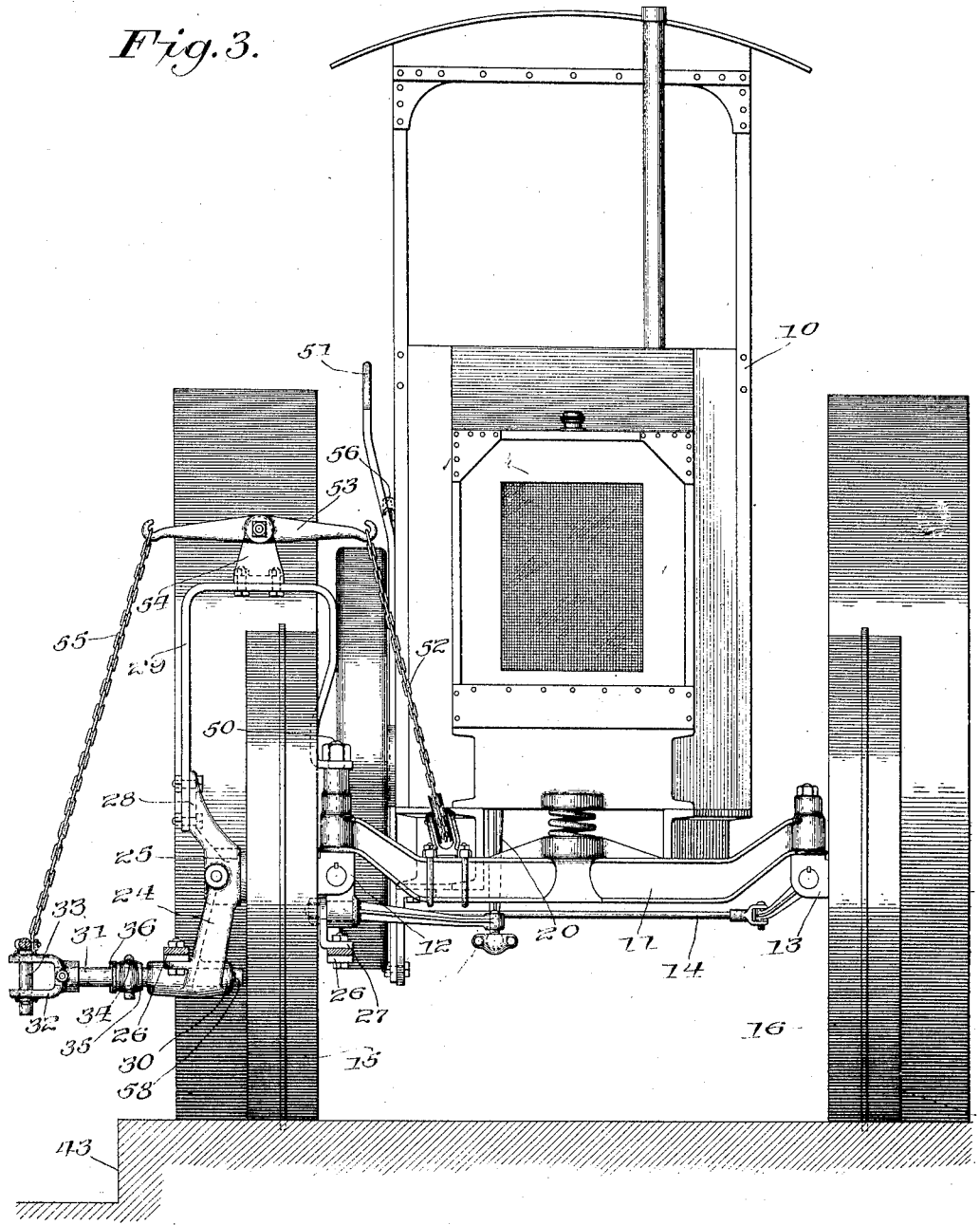
Fig. 3 is a fragmentary front elevation of the steering device showing the manner in which it is connected to the traction engine.

As viewed in Figs. 2 and 5, it is seen that the wheel 41, which is the only one of the two wheels engaging the bottom of the furrow, holds the rear portion of the other wheel 42 in engagement with the side wall of the furrow, said latter wheel 42 being out of engagement with the bottom of the furrow. If for any reason the pilot wheel 42 is thrown out of the furrow, immediately it will be returned thereto due to the fact that the angle at which it is disposed with respect to the side wall of the furrow or general line of draft of the traction engine is such that forward movement of the steering device would cause the pilot wheel 42 to approach and fall back into the furrow. It is to be noted that during the time when the furrow pilot wheel 42 is out of the furrow that the other wheel 41 is out of engagement with the bottom of the furrow. In other words, when both pilot wheels are in the furrow, pilot wheel 41 controls pilot wheel 42, and when pilot wheel 42 is out of the furrow it controls the other pilot wheel 41. Thus this arrangement presents a self-controlling pilot unit.

The forward end of the steering pole member 34 is pivotally mounted in one end of the axle member 40, and, as shown, the members 33 and 34 of the steering pole at all times are parallel with respect to each other. These parallel arranged members 33 and 34 are connected for controlling purposes by a chain 44, which preferably is fixedly secured to the rear of member 33, and adjustably secured by a clamping collar 45 to the other member 34. Also connecting the members 33 and 34 of the steering pole is a chain 46, which normally loosely connects or sags between said members, as shown in full lines in Figs. 1 and 2. This chain 46, however, becomes taut when the members 33 and 34 of the steering pole are moved laterally in one direction to the dotted line position shown in Fig. 2. The length of this chain may be varied, or one end of it may be shifted along the member 34 by means of a collar arrangement 47 for varying the effective lengths thereof to meet different operating requirements. The functions of these chain connections will now be considered.

By shifting the collar 45 of chain 44 along member 34 of the steering pole, the distance between the vertical wall of the furrow and the wheel 15 of the traction engine may be varied. The other chain 46 finds particular application when the traction engine is being guided around a curve. While the traction engine is being guided in a straight line, as shown in the lower diagram of Fig. 6, the steering device and the various parts thereof are arranged, as shown in full lines in Figs. 2 and 5, the pilot wheels 41 and 42 piloting the traction engine and operating in the manner hereinabove considered. In the middle diagram of Fig. 6, it is to be noted that the pilot wheels are taking the curve, and that the traction engine is still continuing in its straight line movement. The traction engine will continue in a straight line movement for a certain time for the reason that the sag or looseness of the chain 46 between members 33 and 34 has not been taken up, or, in other words, said chain has not become taut. The pilot wheels 41 and 42 and the steering pole will continue to take the curve, and the traction engine will continue in its straight line movement until the chain 46 becomes taut, at which time the rod 31 and therefore the stub axle 12 will be swung about the vertical pivot 50 of the stub axle. At the same time through the connections already considered the front wheels 15 and 16 of the traction engine will be turned, and will follow the curve in the proper manner. While making the curve the traction engine and steering device and the parts thereof will assume positions shown in the upper diagram of Fig. 6, and as shown in dotted lines in Fig. 2. In turning into a straight way from a curve the pilot wheels 41 and 42 first will take the straight path, the chain 46 gradually becoming slackened, and the traction engine eventually assuming the straight line direction of movement, the parts thereupon taking the positions as shown in full lines in the lower diagram of Fig. 6, and as shown in full lines in Fig. 2. By means of this arrangement for making curves, plows which may be drawn by traction engines for plowing purposes, will not pass over land already plowed. In other words, plows drawn in this manner will not replow land on a curve thereby lessening the work of a plow on a curve, but the same width of land may be plowed throughout the whole circuit whether or not plows are being drawn around a curve.

By means of this arrangement a traction engine may be automatically and properly guided in straight and curved paths in a most satisfactory and economical manner.

At the same time the pilot device is self-controlling, requiring no attention of the operator after the pilot wheels are once set in place. The pilot wheels may be raised and lowered out of the furrow by a pivotally mounted lever 51, said lever and steering device being connected by a chain 52, one end of which is connected to a lever 53 pivoted in a bracket 54 mounted on strap 29, and a chain 55 connecting the other end of said lever 53 and member 33 of the steering pole. The steering device may be locked in its raised position by a projection 56, which is adapted to be engaged by lever 51. But while this steering device may be raised out of and lowered into the furrow, it is to be noted that it cannot be controlled directly from the cabin of the engine for steering the traction engine. This whole steering device is readily removable from the traction engine, and may be removed therefrom by merely withdrawing a locking pin 58 which passes through an opening in the inner end of rod 31. When this pin is removed the rod 31 may be withdrawn from the bearing portion 30 of casting 24. This will disconnect the entire automatic steering device from the traction engine, the chain 55 being slipped out of engagement with one end of the lever 53.

It is apparent that there may be various modifications of my invention other than that here particularly shown and described, and it is my intention to cover all such modifications which do not involve a departure from the spirit and scope of my invention as set forth in the following claims.

What I claim as new is:

1. In a steering device for vehicles, adjacently arranged furrow pilot members arranged at an angle to the line of draft and to each other, one of which because of said angularity is capable of returning itself to a furrow if effectively removed therefrom, and another of which tends when in the furrow to press said first member against the side of the furrow.

2. In combination, a traction engine, a steering pole extending forwardly therefrom, and a plurality of independently adjustable adjacently arranged furrow pilot wheels mounted thereon at the forward end.

3. In a steering device for traction engines, the combination of a steering pole, a plurality of independently adjustable axles supported thereby, and furrow pilot wheels mounted side by side on said axles.

4. In a steering device for traction engines, a steering pole including parallel arranged members, furrow pilot means supported thereby, flexible connecting means for controlling movements of said parallel members and means for returning said furrow pilot means to the furrow when it becomes removed therefrom.

5. In a steering device for traction engines, a steering pole including relatively movable members arranged at one side of the path of the vehicle, furrow pilot means supported thereby, and flexible connecting means for limiting relative movements of said members.

6. In a steering device for traction engines, a support, a steering pole including a plurality of pivotally mounted members associated with said support, said members being outside the path of the traction engine, pilot means supported by said steering pole, and means extending between said members for controlling the relative pivotal movements of the same.

7. In a steering device for traction engines, the combination of a steering pole including a plurality of pivotally mounted members, said members being outside the path of the traction engine, pilot means supported by said pole, and means extending between said members for limiting the relative pivotal movements of said members in different directions.

8. In a steering device for traction engines, a steering pole including a plurality of members, and a positively acting steering controlling connection between said members which is loose under certain conditions and taut under other conditions.

9. In a steering device for traction engines, the combination of a steering pole including a plurality of members, and a positively acting connection between said members which is loose when the steering device is taking a straight line movement and which may become taut when said steering device is taking a curve.

10. A furrow steering device for tractors, having a plurality of furrow pilot members which are forwardly converging toward a plane substantially parallel to the land side of the furrow, one of which normally engages the side wall only of a furrow, another of which normally engages the bottom only of the furrow, and means for operatively connecting said members to the tactor.

11. A furrow steering device for tractors, having a plurality of furrow pilot members, one of which normally engages the side wall only of a furrow, another of which normally engages the bottom only of the furrow and is inclined at its forward side toward the side wall of the furrow so as to press the first named member thereagainst, and means for operatively connecting said members to the tractor.

12. A furrow steering device for tractors, having a plurality of adjacently arranged furrow pilot members which are forwardly converging toward a plane substantially parallel to the land side of the furrow, one of which normally engages the side wall only of a furrow, another of which normally engages the bottom only of the furrow and rolls thereon, and means for operatively connecting said members to the tractor.

13. A furrow steering device for tractors, having a plurality of rotatable furrow pilot members which are forwardly converging toward a plane substantially parallel to the land side of the furrow, one of which normally engages the side wall only of a furrow, another of which normally engages the bottom only of the furrow, and means for operatively connecting said members to the tractor.

14. In a steering device for motor vehicles, a forwardly projecting steering pole, two forwardly converging laterally spaced disks carried thereby, the bottom of one disk being lower than the bottom of the other.

15. In a steering device for tractors, a forwardly projecting steering pole, two members carried thereby, one adapted to travel along the side wall of a furrow, the other on the bottom of a furrow, the forwardly projecting portions each being forwardly converging toward a line parallel to the line of the furrow.

16. In combination, a tractor steering wheel, and an automatic steering device for said wheel operable in a furrow and comprising a steering pole connected to said steering wheel, a disk rotatably mounted on said steering pole at an angle to the direction of movement of said wheel and bearing against the bottom of a furrow and a second disk at an angle to the first mentioned disk bearing against the side wall of the furrow.

17. In combination, a tractor steering wheel, and an automatic steering device for said wheel including a steering pole connected to said steering wheel, a disk rotatably mounted on said steering pole adapted to bear on the bottom of a furrow and set at an angle to the direction of movement of said wheel so as to return to the furrow when on the plowed side thereof, and another disk mounted on said pole higher than said first disk and set at an angle across the path of said first disk so as to return to the furrow when it is in contact with the unplowed land.

18. A furrow steering device for tractors comprising a pair of disks, and means for connecting said disks to the tractor, one of said disks being rotatably mounted on said connecting means so as to bear on the bottom of a furrow and set at an angle to the direction of movement of said tractor so as to return to the furrow when on the plowed side thereof, and another disk mounted on said connecting means and set at an angle across the path of said first disk so as to return to the furrow when it is in contact with the unplowed land.

19. A furrow steering device for tractors comprising a pair of disks and means for connecting said disks to the tractor, one of said disks being rotatably mounted on said connecting means so as to bear on the bottom of a furrow, and set at an angle to the direction of movement of said tractor so as to return to the furrow when on the plowed side thereof, and another disk mounted on said connecting means and set at an angle across the path of said first disk so as to return to the furrow when it is in contact with the unplowed land, the bottom of said second disk being higher than the bottom of said first disk.

In testimony whereof I affix my signature, is the presence of two witnesses.

CARL W. MOTT.

Witnesses:
  S. E. HOUSTON,
  LESTER B. RUMSEY.